United States Patent [19]

Mulrooney et al.

[11] Patent Number: 5,640,880

[45] Date of Patent: Jun. 24, 1997

[54] MAGNETOSTRICTIVE SENSOR

[75] Inventors: Michael J. Mulrooney, Batavia; James T. Borthwick, Jr., Winfield; Paul G. Janitch, Lisle; Cesar L. Queyquep, Downers Grove, all of Ill.

[73] Assignee: Magnetrol International, Inc., Downers Grove, Ill.

[21] Appl. No.: 404,262

[22] Filed: Mar. 13, 1995

[51] Int. Cl.$^6$ ................................................. G01F 23/30
[52] U.S. Cl. ................................................. 73/313
[58] Field of Search .............................. 73/290 V, 313, 73/314, 866.5

[56] References Cited

U.S. PATENT DOCUMENTS

| | | |
|---|---|---|
| 2,995,736 | 8/1961 | Tellerman . |
| 3,898,555 | 8/1975 | Telllerman . |
| 4,056,979 | 11/1977 | Bongort et al. ............... 73/313 |
| 4,137,768 | 2/1979 | Tushie et al. ............... 374/208 |
| 4,238,844 | 12/1980 | Ueda et al. . |
| 4,803,427 | 2/1989 | Mason et al. ............... 73/314 X |
| 4,939,457 | 7/1990 | Tellerman ............... 324/207.13 |
| 4,943,773 | 7/1990 | Koski et al. ............... 324/207.13 |
| 5,043,685 | 8/1991 | Nyce . |
| 5,070,485 | 12/1991 | Nyce . |
| 5,507,181 | 4/1996 | Fox et al. ............... 73/290 V |

FOREIGN PATENT DOCUMENTS

| | | |
|---|---|---|
| 827258 | 2/1960 | United Kingdom . |
| 896714 | 3/1962 | United Kingdom . |

Primary Examiner—William A. Cuchlinski, Jr.
Assistant Examiner—Willie Morris Worth
Attorney, Agent, or Firm—Wood, Phillips, VanSanten, Clark & Mortimer

[57] ABSTRACT

An improved mounting arrangement is shown for a magnetostrictive level sensing instrument for sensing level of a process fluid in a process vessel. The process vessel includes an opening into a storage space in the vessel. The improvement includes an elongate tube having a closed end and an opposite open end. A process fitting receives the open end of the outer tube, the process fitting being adapted to be received in the vessel opening, in use, whereby the process fitting and the elongate tube seal the vessel opening. A magnetostrictive wire assembly is removably received in the elongate tube through the open end for operatively sensing position of a magnetic float captured on the elongate tube and floating atop the fluid in the vessel. A housing is mounted to the adaptor fitting and supports the wire assembly when the wire assembly is received in the tube.

22 Claims, 3 Drawing Sheets

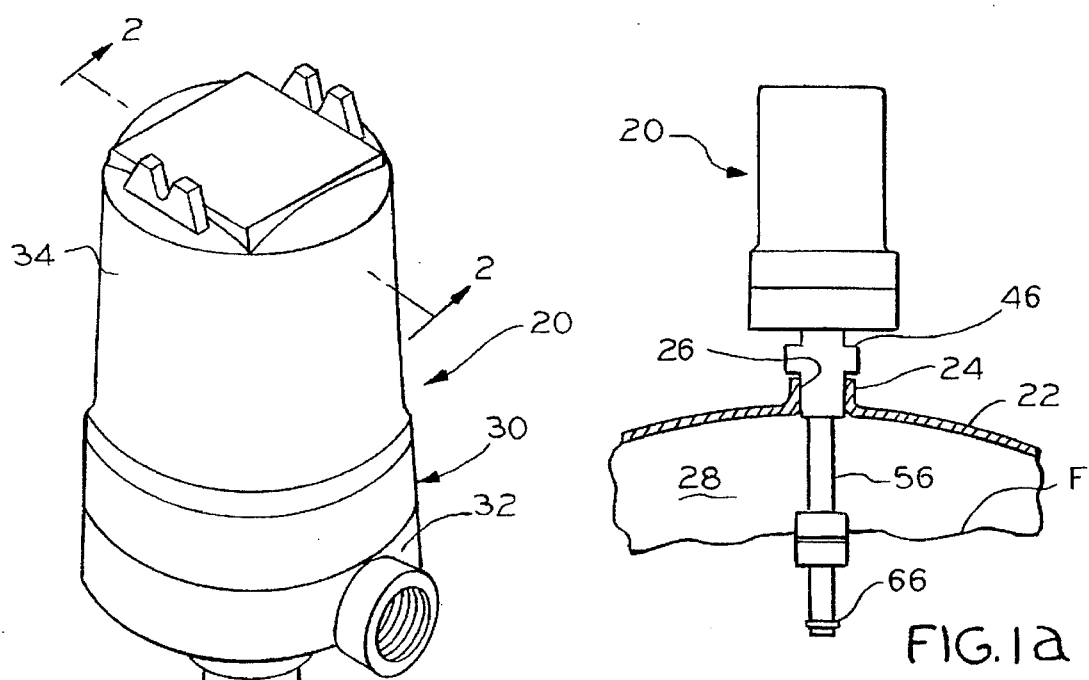
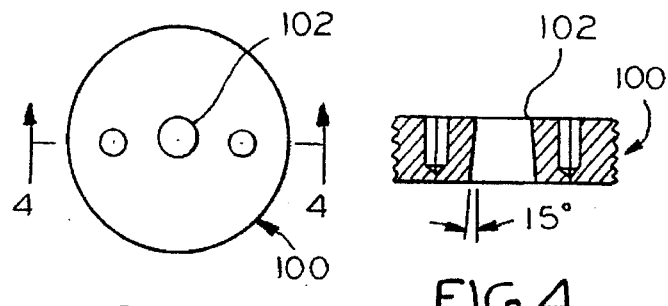
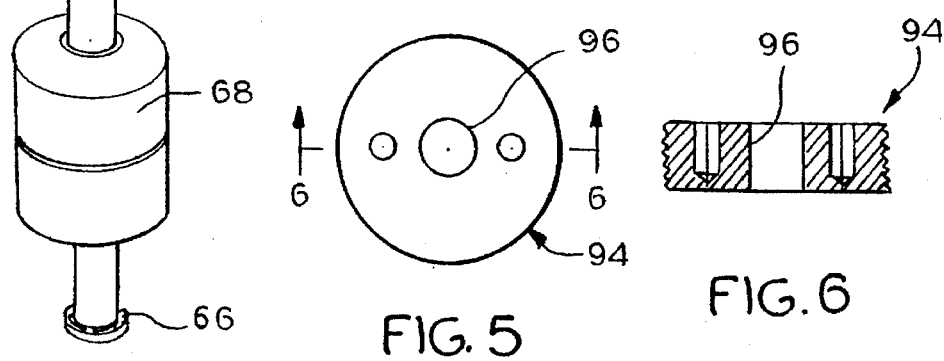
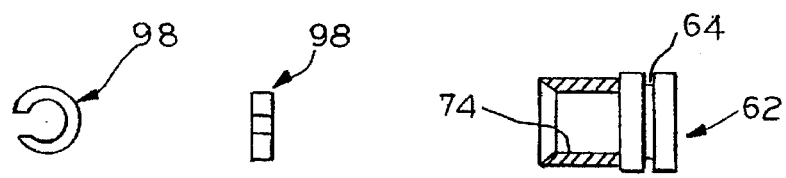

MAGNETOSTRICTIVE SENSOR

FIELD OF THE INVENTION

The present invention relates to magnetostrictive level sensing instruments and, more particularly, to an improved mounting arrangement therefor.

BACKGROUND OF THE INVENTION

Level sensing instruments are used for sensing level of a process fluid in a process vessel. Many such instruments are of the intrusive type in which a sensing apparatus is exposed to the process fluid for sensing level. One such type of intrusive instrument comprises a magnetostrictive sensor. A magnetostrictive sensor has a magnetostrictive wire assembly including a magnetostrictive wire maintained under tension in a tube. The tube extends into the process vessel. A magnetic float is captured on the tube and floats atop the fluid in the vessel. An electrical pulse is transmitted on the magnetostrictive wire. The electrical pulse interacts with the magnetic field of the float, which creates a torque on the wire to cause an acoustic pulse to be sent on the wire. The time of flight between the transmission of the electrical pulse and the receipt of the acoustic pulse is sensed for determining distance of the process fluid from the instrument, representing level. With such a magnetostrictive level sensing instrument, the tube is mounted to an electronics housing. The housing is in turn connected to a process fitting installed in an opening in the vessel.

In a typical application, a process vessel includes an opening into a storage space in the vessel. In high pressure, high temperature, or explosive environments, it is desirable to maintain the process sealed. Such an opening can be sealed simply by installing the particular level sensing instrument. However, when the instrument, in this case the magnetostrictive wire assembly, must be removed for servicing or replacement, the seal is broken. Advantageously, the mounting arrangement would include a process seal which need not be interfered with in order to service or replace the level sensing instrument.

The present invention is directed to solving one or more of the problems discussed above in a novel and simple manner.

SUMMARY OF THE INVENTION

In accordance with the invention a magnetostrictive level sensing instrument includes a mounting arrangement having a process seal which can be installed prior to installation of a magnetostrictive wire assembly.

Broadly, there is disclosed herein an improvement in a magnetostrictive level sensing instrument for sensing level of a process fluid in a process vessel. The process vessel includes an opening into a storage space in the vessel. The improvement includes an elongate tube having a closed end and an opposite open end. A process fitting receives the open end of the outer tube, the process fitting being adapted to be received in the vessel opening, in use, whereby the process fitting and the elongate tube seal the vessel opening. A magnetostrictive wire assembly is removably received in the elongate tube through the open end for operatively sensing position of a magnetic float captured on the elongate tube and floating atop the fluid in the vessel. A housing is mounted to the adaptor fitting and includes means for supporting the wire assembly when the wire assembly is received in the tube.

In one aspect of the invention the elongate tube comprises a stainless steel tube.

The magnetostrictive wire assembly comprises an inner tube telescopically received in the elongate tube and housing a magnetostrictive wire under tension. The supporting means supports the inner tube to the housing under compression. The supporting means comprises a compression nut threadably received in the housing and biasing a compression ring in the form of a split compression ring received on the inner tube.

According to another aspect of the invention the inner tube comprises an aluminum tube.

A plurality of spacers are disposed between the inner tube and the elongate tube to maintain the tubes in spaced relation from one another.

In accordance with an alternative aspect, a magnetostrictive level sensing instrument is provided for sensing level of a process fluid in a process vessel. The process vessel includes an opening into a storage space in the vessel. The instrument includes a housing defining an enclosed space enclosing a magnetostrictive sensing circuit. An elongate outer tube has a closed end and an opposite open end. A process fitting has a through opening receiving the open end of the outer tube. The process fitting is adapted to be received in the vessel opening, in use, whereby the process fitting and the elongate tube together seal the vessel opening, the housing being removably received on the process fitting so that an inside of the outer tube is open to the enclosed space. A magnetostrictive wire assembly is mounted to the housing and includes a magnetostrictive wire electrically connected to the sensing circuit to be driven thereby. The wire assembly is removably received in the elongate tube through the open end incident to the housing being mounted to the process fitting for operatively sensing position of a magnetic float captured on the elongate tube and floating atop the fluid in the vessel.

In accordance with another aspect the housing includes a base having a through opening threaded on an outer side for receiving the process fitting and threaded on an inner side for threadably receiving a retaining means for mounting the wire assembly relative to the housing. The magnetostrictive wire assembly comprises an inner tube telescopically received in the outer tube and housing a magnetostrictive wire under tension. The inner tube is supported by the retaining means. The retaining means comprises a bushing threadably received in the housing opening from the inner side, the inner tube extending through an opening in the bushing to center the inner tube relative to the outer tube. The bushing opening is flared and the flared opening engages a retaining ring on the inner tube to provide a compression fit. The retaining means further includes a centering bushing threadably received in the housing opening from the inner side, the inner tube extending through an opening in the centering bushing to center the inner tube relative to the outer tube.

Further features and advantages of the invention will be readily apparent from the specification and from the drawing.

BRIEF DESCRIPTION OF THE DRAWING

FIG. 1 is a perspective view of a magnetostrictive level sensing instrument including the mounting arrangement according to the present invention;

FIG. 1a is a perspective, partial sectional view showing the instrument of FIG. 1 mounted in a process vessel;

FIG. 3 is an elevation view of a retaining bushing for the instrument of FIG. 1;

FIG. 4 is a sectional view taken along the line 4—4 of FIG. 3;

FIG. 5 is an elevation view of a centering bushing for the instrument of FIG. 1;

FIG. 6 is a sectional view taken along the line 6—6 of FIG. 5;

FIG. 7 is an elevation view of a retaining ring used with the retaining bushing of FIG. 3;

FIG. 8 is a side view of the retaining ring of FIG. 7;

FIG. 9 is an elevation view of an end plug for the instrument of FIG. 1;

DETAILED DESCRIPTION OF THE DRAWING

Figure 2:
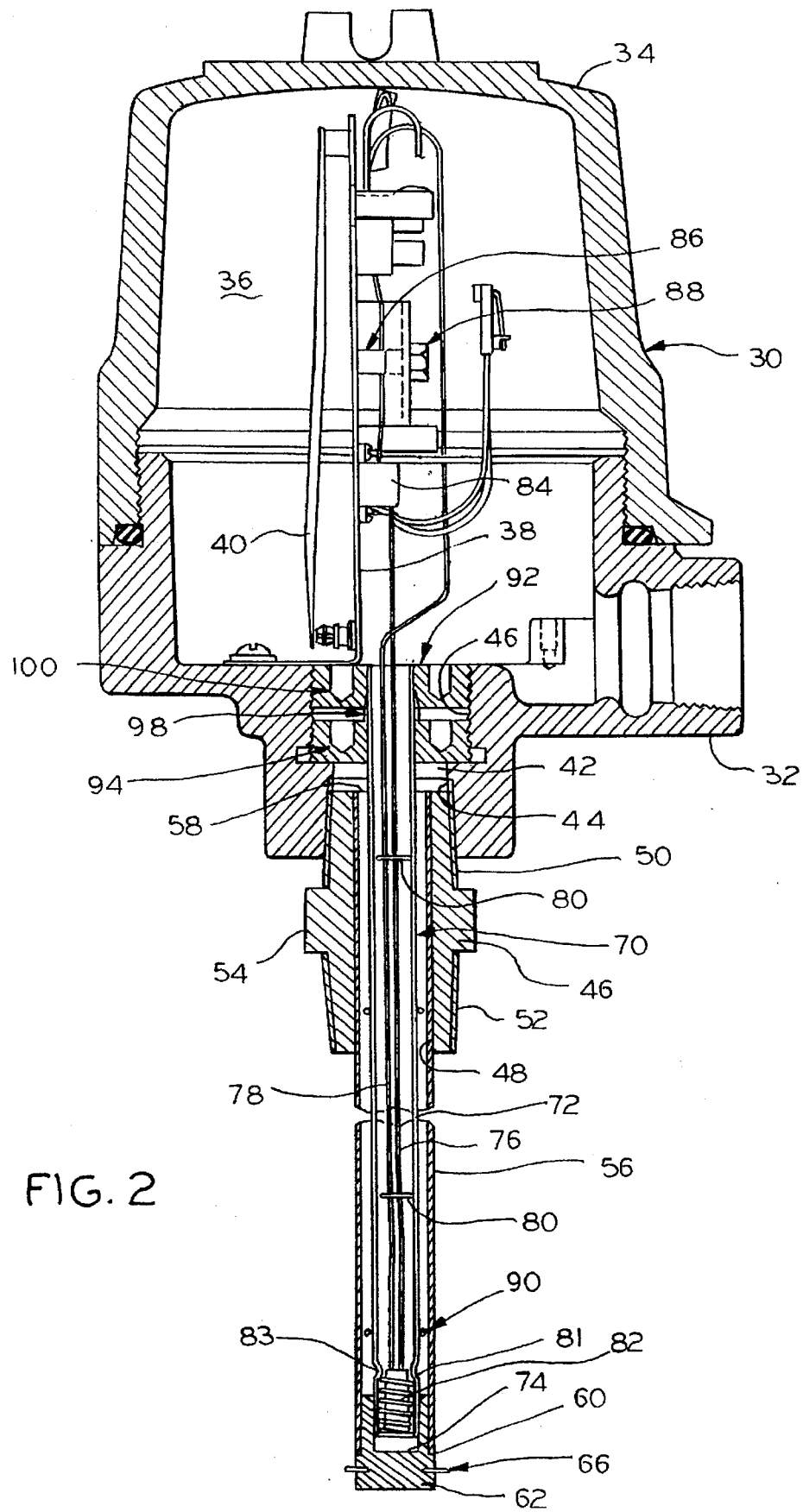
FIG. 2 is a sectional view of the instrument of FIG. 1 taken along the line 2—2 of FIG. 1 with the float omitted.

Referring to FIG. 1 and FIG. 1a, a magnetostrictive level sensing instrument 20 is shown for sensing level of a process fluid F in a process vessel 22. The process vessel 22 includes a neck 24 defining a threaded top opening 26 into a storage space 28 containing the process fluid F. The magnetostrictive level sensing instrument 20 is operable to determine distance of a top surface of the fluid F from the top opening 26, as discussed below, i.e., level in the vessel 22.

The term "fluid" is used herein to refer to any type of media which can be stored in a process vessel and sensed in accordance with the teachings described herein.

Referring to FIG. 1 and FIG. 2, the magnetostrictive level sensing instrument 20 includes a housing 30 comprised of a base 32 and cover 34 threadably mounted thereon. The housing 30 defines an enclosed space 36, see FIG. 2. A bracket 38 mounted to the base 32 supports a circuit board 40 including a magnetostrictive sensing circuit. The particular magnetostrictive sensing circuit used does not form part of the invention and is therefore not disclosed in detail herein and may comprise any conventional form of magnetostrictive sensing circuit, as is obvious to those skilled in the art.

The base 32 includes a central through opening 42. An outer side 44 is threaded for ¾ inch npt connection. An inner side includes a threaded counterbore 46, as described below.

A conventional process fitting 46 includes a through opening 48. A first end 50 includes a ¾ inch npt thread as does a second end 52. The ends 50 and 52 are separated by a central portion 54 including flats adapted to receive a wrench or the like for installation.

An elongate stainless steel outer tube 56 includes an open end 58 and an opposite end 60 closed with an end plug 62. The outer tube 56 has an insertion length IL determined by the range of level to be sensed in the vessel 22. With reference also to FIG. 9, the end plug 62 comprises a solid Teflon plug including an outer annular groove 64 for receiving an E-ring 66, see FIG. 1. The outer tube open end 58 is received in the process fitting opening 48 and is welded therein to provide a sealed fit.

In use, the process fitting 46 having the elongate tube 56 welded thereon is threadably mounted in the vessel threaded neck opening 26, see FIG. 1A, so that the elongate tube 56 extends into the process vessel 22. As a result, the process fitting 46 and the elongate tube 56, including the end plug 62, seal the opening 26. A magnetic float 68 is captured on the elongate tube 56 and floats atop the fluid F. The E-ring 66 maintains the float 68 on the outer tube 56.

Referring to FIG. 2, a magnetostrictive wire assembly 70 is shown in sectional view. The magnetostrictive wire assembly 70 is of conventional construction and includes an elongate inner tube 72 which may be of aluminum. The length of the inner tube 72 is selected so that it extends from the top of the base opening 42 to the bottom of the outer tube 56 where it is received in a partial bore 74 in the end plug 62. The inner tube 72 encloses a conventional magnetostrictive wire 76 and a return wire 78. A plurality of spacers 80 maintain the magnetostrictive wire 76 and return wire 78 in spaced relation from one another and from the walls of the inner tube 72. Distal ends of the magnetostrictive wire 76 and return wire 78 are connected to one another at a termination 81. The termination 81 is held under bias by a spring 82 at the bottom of the inner tube 72. The spring is maintained in position by an annular indent 83 in the inner tube 72.

The magnetostrictive wire 76 passes through a pick-up coil 84 mounted to the bracket 38 for picking up an acoustic pulse on the wire 76. The coil 84 is connected to the circuit board 40 in a conventional manner. The magnetostrictive wire 76 then passes through a dampening fixture 86 which is tightened using a screw 88 to maintain the magnetostrictive wire 76 under tension. The spring 82 is particularly adapted to maintain proper tension on the wire 76 with temperature changes.

A plurality of longitudinally spaced O-rings 90 surround the inner tube 72 and ensure that it does not contact the outer tube 56.

The inner tube 72 is rigidly mounted to the housing 34 at 92. Particularly, a centering bushing 94, see FIGS. 5 and 6, includes a central through opening 96 of a size corresponding to the outer diameter of the inner tube 72 to be received therein. The centering bushing 94 is threadably received in the threaded counterbore 46 from the inner side to maintain the inner tube 72 centered. A compression ring 98 comprising a split compression ring, see FIGS. 7 and 8, is disposed on the outer tube 72 above the centering bushing 94. A compression nut in the form of a retaining bushing 100, see also FIGS. 3 and 4, is of similar size to the centering bushing 94 and also includes a central opening 102. The opening 102 is flared to provide an approximately 15° angle, see FIG. 14. As a result, when the retaining bushing 100 is threadably received in the threaded counterbore 46, the flared opening 102 compresses the retaining ring 98 on the inner tube 72 to rigidly mount the inner tube 72 relative to the housing base 32.

Owing to the above construction of the magnetostrictive level sensing instrument 20, the process fitting 46 having the outer tube 56 secured thereon enclosed by the end plug 62 can be installed in the process vessel as shown in FIG. 1a to provide a process seal without the magnetostrictive wire assembly 70 and housing 30 installed. The vessel can then be placed in service. Subsequently, the housing 30 having the magnetostrictive wire assembly 70 mounted thereon can be installed as by sliding the inner tube 72 having the spacers 90 mounted thereon into the outer tube 56 from the open end 58 until the distal end is received in the plug counterbore 74. The housing 30 is then turned so that the process fitting threaded first end 50 is received in the threaded opening 44, as shown in FIG. 2. The process can subsequently be reversed to remove and service the unit while the process vessel remains sealed.

The actual operation of the magnetostrictive sensor 20 is of a conventional nature in that an electrical pulse is sent down the magnetostrictive wire 76. The pulse is propagated virtually instantaneously at the speed of light. The electrical signal interacts with the magnetic field from the float 68 which creates torque on the magnetostrictive wire 76 to create a mechanical wave which propagates to the top and the bottom. The speed of return of the acoustic pulse depends on the alloy used in the magnetostrictive wire 76. The coil 84 picks up the return pulse for transmission to the associated sensing circuit. The dampening fixture 86 minimizes bounce of the wire to the coil 84. The spring 82 maintains tension on the wire with changes in temperature. The stainless steel outer tube 56 protects the magnetostrictive wire assembly 70 from the process environment. The aluminum inner tube 72 mechanically holds the magnetostrictive wire assembly 70. The O-rings 90 prevent contact between the tubes 56 and 72 which could cause dampening of the transmitted signals.

Figure 10:
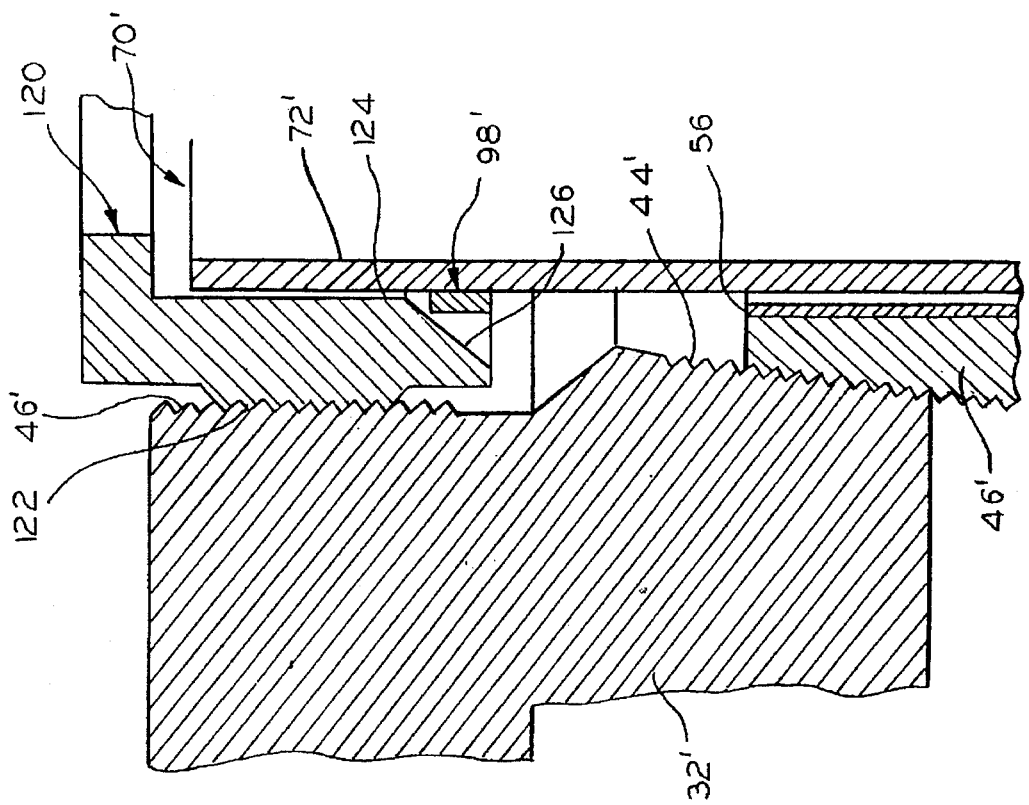
FIG. 10 is a sectional view showing an alternate mounting arrangement for the instrument of FIG. 1.

Referring to FIG. 10, an alternative arrangement for mounting a magnetostrictive wire assembly 70' is illustrated. For simplicity, like elements for those shown in the above embodiment are identified with like, primed reference numerals and are not further described in detail herein.

In the alternative arrangement, the centering bushing 94 and retaining bushing 100 are eliminated and replaced with an elongate compression nut 120. The compression nut 120 is generally cylindrical and includes an outer wall threaded as at 122 for being threadably received in the base threaded counterbore 46. The compression nut includes a central opening 124 flared at an outer end 126. As is apparent, when the compression nut is threaded in the counterbore 46' the flared opening 126 forces the split compression ring 98' under compression into the outer wall of the inner tube 72' to maintain it in position as shown.

Figure 11:
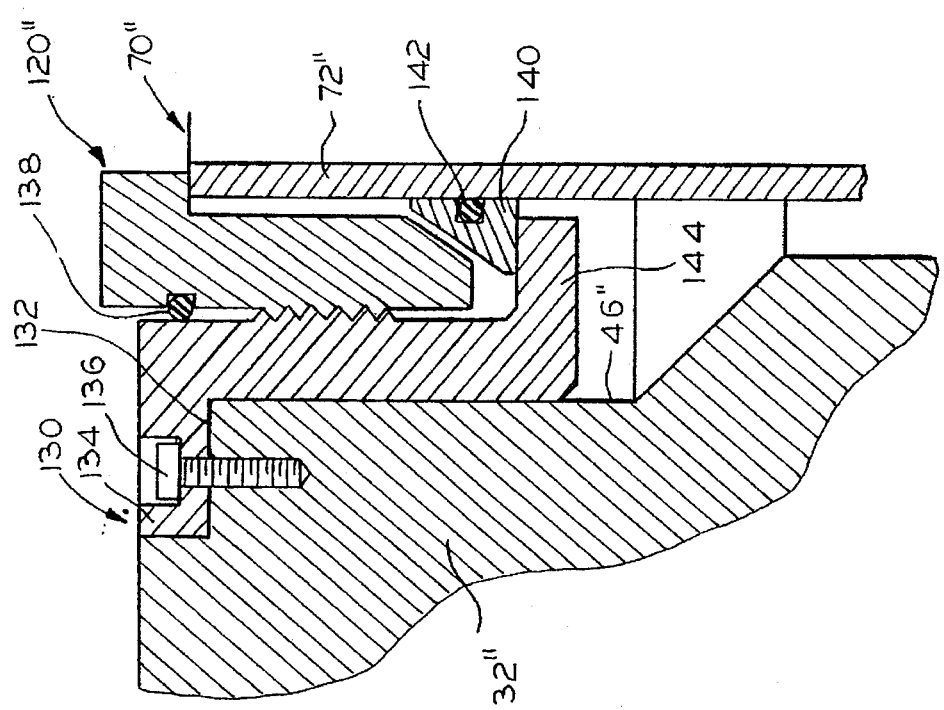
FIG. 11 is a sectional view similar to that of FIG. 10 for a further alternate mounting arrangement.

Referring to FIG. 11, a still further alternative embodiment is shown for mounting a magnetostrictive wire assembly 70" to the housing base 32". As above, like elements are identified with like, double primed reference numerals.

In this embodiment, a compression nut 120", similar to the compression nut 120 of FIG. 10, is also used. However, the compression nut 120", rather than being connected directly to the housing base 32", is threadably received in a retainer element 130 which is held in an enlarged counterbore 46" having a further counterbore 132 receiving a flange 134 of the retainer 130. A plurality of screws or the like 136 are used for securing the retainer 130 to the housing base 32" as shown. An O-ring 138 provides a seal between the retainer 130 and the compression nut 120". The compression nut 120" acts on a frustoconical compression ring 140 having an O-ring seal 142. The retainer 130 includes a collar 144 for supporting the compression ring 140. In this embodiment, the retainer is placed around the inner tube which supports the compression ring 140 so the compression ring 140 abuts the collar 144, as shown. The compression nut is then tightened so that the inner tube 72" is securely maintained in the retainer 130 which is then screwed into the housing base 32", as shown.

Thus, in accordance with the invention there is disclosed a magnetostrictive level sensing instrument which enables the process to be started up prior to final installation of the instrument and allows the instrument to be repaired without shutting down the process.

We claim:

1. In a magnetostrictive level sensing instrument for sensing level of a process fluid in a process vessel, the process vessel including an opening into a storage space in the vessel, the improvement comprising:

an elongate tube having a closed end and an opposite open end;

a process fitting receiving the open end of the outer tube, the process fitting being adapted to be received in the vessel opening, in use, whereby the process fitting and the elongate tube together seal the vessel opening;

a magnetostrictive wire assembly removably received in the elongate tube through the open end for operatively sensing position of a magnetic float captured on the elongate tube and floating atop the fluid in the vessel; and a housing mounted to said process fitting and including means for supporting said wire assembly when the wire assembly is received in the tube.

2. The improvement of claim 1 wherein said elongate tube comprises a stainless steel tube.

3. The improvement of claim 1 wherein said magnetostrictive wire assembly comprises an inner tube telescopically received in the elongate tube and housing a magnetostrictive wire under tension.

4. The improvement of claim 3 wherein said supporting means supports said inner tube to said housing under compression.

5. The improvement of claim 4 wherein said supporting means comprises a compression nut threadably received in said housing and for biasing a compression ring received on said inner tube.

6. The improvement of claim 5 wherein said compression ring comprises a split compression ring.

7. The improvement of claim 3 wherein said inner tube comprises an aluminum tube.

8. The improvement of claim 3 further comprising a plurality of spacers disposed between said inner tube and said elongate tube to maintain said tubes in spaced relation from one another.

9. A magnetostrictive level sensing instrument for sensing level of a process fluid in a process vessel, the process vessel including an opening into a storage space in the vessel, comprising:

a housing defining an enclosed space enclosing a magnetostrictive sensing circuit;

an elongate outer tube having a closed end and an opposite open end;

a process fitting having a through opening receiving the open end of the outer tube, the process fitting being adapted to be received in the vessel opening, in use, whereby the process fitting and the elongate tube together seal the vessel opening, the housing being removably received on the process fitting so that an inside of the outer tube is open to the enclosed space; and a magnetostrictive wire assembly mounted to said housing and including a magnetostrictive wire electrically connected to the sensing circuit to be driven thereby, the wire assembly being removably received in the elongate tube through the open end when the housing is mounted to the process fitting for operatively sensing position of a magnetic float captured on the elongate tube and floating atop the fluid in the vessel.

10. The magnetostrictive level sensing instrument of claim 9 wherein said outer tube comprises a stainless steel tube.

11. The magnetostrictive level sensing instrument of claim 9 wherein said magnetostrictive wire assembly comprises an inner tube telescopically received in the outer tube and housing a magnetostrictive wire under tension.

12. The magnetostrictive level sensing instrument of claim 11 further comprising supporting means for supporting said inner tube to said housing under compression.

13. The magnetostrictive level sensing instrument of claim 12 wherein said supporting means comprises a compression nut threadably received in said housing and for biasing a compression ring received on said inner tube.

14. The magnetostrictive level sensing instrument of claim 13 wherein said compression ring comprises a split compression ring.

15. The magnetostrictive level sensing instrument of claim 11 wherein said inner tube comprises an aluminum tube.

16. The magnetostrictive level sensing instrument of claim 11 further comprising a plurality of spacers disposed between said inner tube and said outer tube to maintain said tubes in spaced relation from one another.

17. The magnetostrictive level sensing instrument of claim 9 wherein said housing includes a base having a through opening threaded on an outer side for receiving the process fitting and threaded on an inner side for threadably receiving a retaining means for mounting the wire assembly relative to the housing.

18. The magnetostrictive level sensing instrument of claim 17 wherein said magnetostrictive wire assembly comprises an inner tube telescopically received in the outer tube and housing a magnetostrictive wire under tension, the inner tube being supported by the retaining means.

19. The magnetostrictive level sensing instrument of claim 18 wherein said retaining means comprises a bushing threadably received in the housing opening from the inner side, the inner tube extending through an opening in the bushing to center the inner tube relative to the outer tube.

20. The magnetostrictive level sensing instrument of claim 19 wherein said bushing opening is flared and the flared opening engages a retaining ring on the inner tube to provide a compression fit.

21. The magnetostrictive level sensing instrument of claim 20 wherein said retaining means further comprises a centering bushing threadably received in the housing opening from the inner side, the inner tube extending through an opening in the centering bushing to center the inner tube relative to the outer tube.

22. The magnetostrictive level sensing instrument of claim 13 wherein said housing includes a base and a retainer threadably receiving the compression nut and means for mounting the retainer to the base.

\* \* \* \* \*